(12) United States Patent
Ishikawa

(10) Patent No.: US 7,100,720 B2
(45) Date of Patent: Sep. 5, 2006

(54) DRIVING POWER CONTROL DEVICES FOR HYBRID VEHICLE

(75) Inventor: Yutaka Ishikawa, Utsunomiya (JP)

(73) Assignee: Honda Giken Kogyo Kabushiki Kaish, Tokyo (JP)

( * ) Notice: Subject to any disclaimer, the term of this patent is extended or adjusted under 35 U.S.C. 154(b) by 457 days.

(21) Appl. No.: 10/385,728

(22) Filed: Mar. 12, 2003

(65) Prior Publication Data

US 2003/0173125 A1 Sep. 18, 2003

(30) Foreign Application Priority Data

Mar. 15, 2002 (JP) ..................... 2002-072639

(51) Int. Cl.
B60K 1/00 (2006.01)

(52) U.S. Cl. .......................... 180/65.2; 477/3
(58) Field of Classification Search ............. 180/65.2, 180/65.3; 701/22; 477/2–6; 290/40 A; 322/14–16
See application file for complete search history.

(56) References Cited

U.S. PATENT DOCUMENTS

| 6,070,680 | A | * | 6/2000 | Oyama ..................... 180/65.2 |
| 6,636,787 | B1 | * | 10/2003 | Yamaguchi et al. .......... 701/22 |
| 6,846,265 | B1 | * | 1/2005 | Yamamoto et al. ........... 477/3 |
| 2003/0186778 | A1 | * | 10/2003 | Yamamoto ................... 477/5 |
| 2004/0149502 | A1 | * | 8/2004 | Itoh et al. .................. 180/65.2 |

FOREIGN PATENT DOCUMENTS

| JP | 1-141273 | 6/1989 |
| JP | 3-61761 | 3/1991 |
| JP | 5-96978 | 4/1993 |
| JP | 5-133469 | 5/1993 |
| JP | 5-172239 | 7/1993 |
| JP | 6-87356 | 3/1994 |
| JP | 7-42825 | 2/1995 |
| JP | 8-68459 | 3/1996 |
| JP | 9-204201 | 8/1997 |
| JP | 9-292018 | 11/1997 |
| JP | 11-63208 | 3/1999 |
| JP | 2000-118246 | 4/2000 |
| JP | 2000-145951 | 5/2000 |
| JP | 2000-170903 | 6/2000 |
| JP | 2001-90830 | 4/2001 |
| JP | 2001-193834 | 7/2001 |
| JP | 2003-278911 | * 10/2003 |

OTHER PUBLICATIONS

Japanese Patent Office —Office Action dated Dec. 9, 2003.

* cited by examiner

Primary Examiner—Bryan Fischmann
(74) Attorney, Agent, or Firm—Westerman, Hattori, Daniels & Adrian, LLP

(57) ABSTRACT

A driving power control device for a hybrid vehicle controls the engagement state of a lockup clutch so that high efficiency in regeneration is obtainable. The driving power control device for a hybrid vehicle includes an engine and a motor-generator as power sources, an automatic transmission disposed between the power sources and driving wheels with an intervening torque converter having a lockup clutch, and an ECU for controlling selection of the power sources and for controlling a slip ratio of the torque converter. In this control device, a target slip ratio of the torque converter, which corresponds to a target amount of regeneration that is retrieved using regeneration amount determining factors, is obtained by executing a feedforward control operation using friction torque determining factors, and the slip ratio is controlled in a feedback manner based on the difference between the target slip ratio and the actual slip ratio.

6 Claims, 7 Drawing Sheets

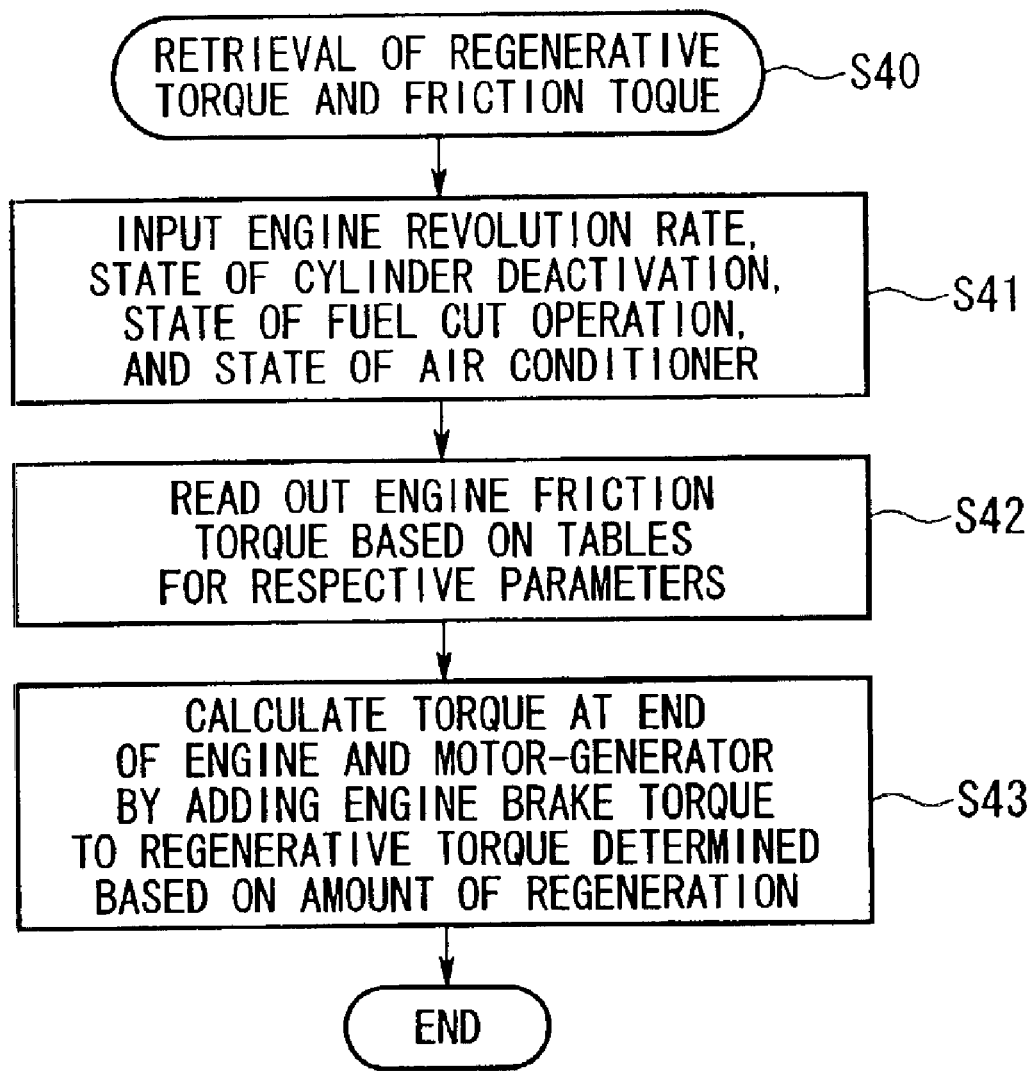

DRIVING POWER CONTROL DEVICES FOR HYBRID VEHICLE

BACKGROUND OF THE INVENTION

1. Field of the Invention

The present invention relates to a driving power control device for a hybrid vehicle, which comprises an engine and a motor-generator as power sources, and an automatic transmission disposed between the power sources and driving wheels with an intervening torque converter having a lockup clutch, and which controls the degree of engagement of a lockup clutch during a regenerative operation.

2. Description of the Related Art

Conventionally, a hybrid vehicle is known in the art, in which an engine and a motor-generator are provided as driving sources, and a portion of the kinetic energy of the vehicle is converted, by the motor-generator, into electrical energy which is stored in a battery device (generally known as a regenerative process) so that fuel efficiency can be improved. In such hybrid vehicles, a hybrid vehicle is also known, in which a torque converter having a lockup clutch is provided between the driving sources and driving wheels, and transmission efficiency of the driving power is adjusted by the lockup clutch.

In the above-mentioned regeneration process, if the lockup clutch is connected to the motor-generator during regenerative process, the kinetic energy of the driving wheels can be directly transmitted to the motor-generator. However, because torque fluctuations in the power sources are also directly transmitted to the driving wheels, noise and vibration are generated, which leads to degradation of drivability. Therefore, it is important to control the engaging state of the lockup clutch so as to obtain high efficiency of regeneration while preventing the above problems.

To prevent the above problems, a control device has been proposed, which controls the oil pressure for a lockup clutch so that power from power sources is transmitted with slip during a regeneration process. For example, a control device is disclosed in Japanese Unexamined Patent Application, First Publication No. 2000-170903, which comprises a control section for controlling the engaging state of a lockup clutch, and which performs a control operation while receiving feedback of the engaging state (oil pressure) of the lockup clutch so that maximum efficiency of regeneration can be obtained.

However, a hybrid vehicle is driven in various driving states (for example, with or without brake operation, with or without cylinder deactivation operation, etc.), and obtainable regenerated electrical power (the amount of regeneration) varies depending on the driving state. Therefore, when the driving state changes, the amount of regeneration may vary considerably. Because the engaging state (controlling oil pressure) of the lockup clutch required to obtain the amount of regeneration at times varies considerably, it is impossible to control the engaging state so as to track large variations by controlling the oil pressure for the lockup clutch merely by a feedback method as described above.

SUMMARY OF THE INVENTION

In consideration of the above circumstances, an object of the present invention is to provide a driving power control device for a hybrid vehicle, which can control the oil pressure for a lockup clutch so that high efficiency in regeneration is obtainable even when the driving state of the vehicle changes.

In order to achieve the above object, the present invention provides a driving power control device for a hybrid vehicle comprising: an engine and a motor-generator as power sources; an automatic transmission disposed between the power sources and driving wheels with an intervening torque converter having a lockup clutch; and a control section for controlling selection of the power sources and for controlling a slip ratio of the lockup clutch of the torque conveter using oil pressure, wherein the control section is adapted to determine a target amount of regeneration depending on regeneration amount determining factors obtained in accordance with the driving state of the vehicle, to calculate a required regeneration torque based on regenerative torque corresponding to the target amount of regeneration while also incorporating friction torque retrieved depending on friction torque determining factors, to perform feedforward control in which a base oil pressure with which the required regeneration torque is transmittable is calculated, and an oil pressure of the lockup clutch is controlled to the base oil pressure calculated so as to obtain a target slip ratio of the lockup clutch, and to control the oil pressure of the lockup clutch in a feedback manner based on the difference between the target slip ratio and the actual slip ratio.

According to the above control device for a hybrid vehicle, because the target amount of regeneration is retrieved depending on the regeneration amount determining factors obtained in accordance with the driving state of the vehicle, the amount of regeneration can be set so that high efficiency in regeneration is obtainable even when the driving state changes. Moreover, because the required torque is calculated based on regenerative torque corresponding to the target amount of regeneration while also incorporating friction torque applied to the power sources due to, for example, changes in the driving state, it is possible to determine the required torque which is necessary to obtain the required amount of regeneration while maintaining preferable drivability.

Furthermore, because the base oil pressure with which the required torque is transmittable is calculated, and feedforward control is performed to obtain the target slip ratio of the torque converter by controlling the oil pressure for the lockup clutch so as to achieve the base oil pressure, the lockup clutch can be controlled so as to achieve an appropriate engaging state depending on the driving state. In addition, an appropriate base oil pressure is obtainable depending on the driving state even when the driving state changes. Moreover, because the target slip ratio of the torque converter is controlled in a feedforward manner using the base oil pressure, the target slip ratio can be controlled in such a manner that the base oil pressure follows the changes in the driving state even when the driving state changes.

In addition, by controlling the oil pressure for the lockup clutch in a feedback manner based on the difference between the target slip ratio and the actual slip ratio, higher efficiency in regeneration is obtainable. Accordingly, the oil pressure for the lockup clutch can be controlled so that high efficiency in regeneration is obtainable even when the driving state changes.

The regeneration amount determining factors include at least one of state of charge (SOC) of a battery, gear position (GP) in the automatic transmission, whether or not an air conditioner is operated, revolution rate of the engine, brake operation state of the vehicle, etc. The friction torque determining factors include at least one of whether or not a cylinder deactivation operation is executed, whether or not a fuel cut operation is executed, engine revolution rate, whether or not an air conditioner is operated (load of the air conditioner), temperature of engine cooling water, etc. More specifically, the friction torque determining factors preferably include whether or not a fuel cut operation is executed during deceleration, whether or not a cylinder deactivation operation is executed, and load of an air conditioner.

The control section (e.g., an ECU) may preferably store a table defining a relationship between the target amount of regeneration and the revolution rate of the engine.

The control section may preferably store a table defining a relationship between the base oil pressure for the lockup clutch and the transmittable torque capacity of the lockup clutch.

BRIEF DESCRIPTION OF THE DRAWINGS

FIG. 5 is a flowchart showing a subroutine for executing an operation for retrieving a friction torque when a regenerative operation is selected in the flowchart shown in FIG. 2.

DESCRIPTION OF THE PREFERRED EMBODIMENTS

Figure 1:
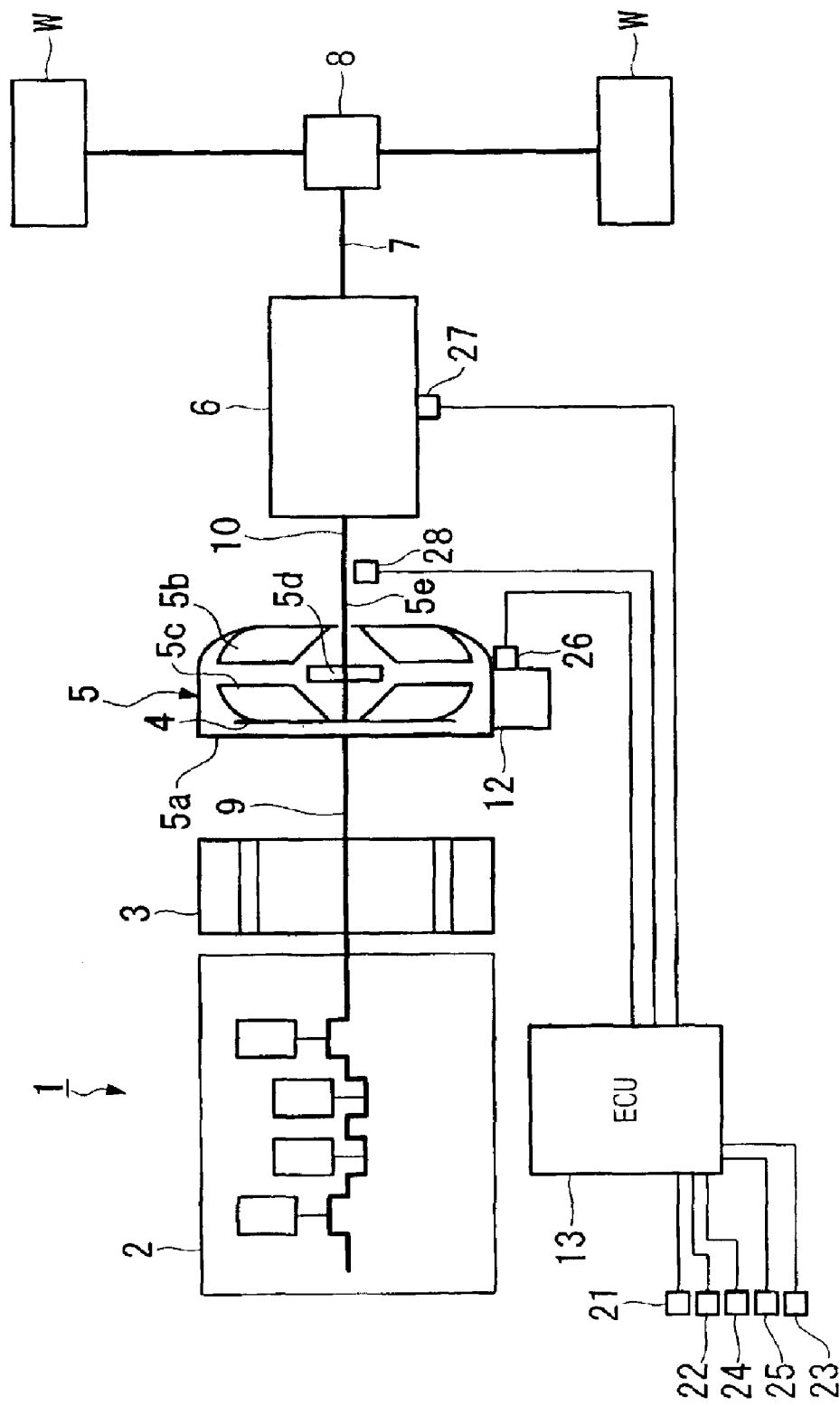
FIG. 1 is a diagram showing the general structure of a driving power control device for a hybrid vehicle in an embodiment according to the present invention.

An embodiment of the driving power control device for a hybrid vehicle according to the present invention will be explained below with reference to the appended drawings. FIG. 1 is a schematic diagram showing the general structure of a driving power control device for a hybrid vehicle in an embodiment according to the present invention.

As shown in FIG. 1, as power sources, an engine 2 and a motor-generator 3 are connected in series. An automatic transmission 6 is connected to the power sources in such a manner that the automatic transmission 6 is disposed between the power sources and driving wheels W and W with an intervening torque converter 5 having a lockup clutch 4. In addition, a differential gear device 8 is disposed between the automatic transmission 6 and the driving wheels W and W. The rotational shaft of the motor-generator 3 is connected to the input side of the torque converter 5, and an input shaft 10 of the automatic transmission 6 is connected to the output side of the torque converter 5. Moreover, there are provided an oil pump 12 and an ECU 13 together for supplying control oil pressure for controlling the engaging state of the lockup clutch 4.

The torque converter 5 transmits torque using fluid. The torque converter 5 comprises a front cover 5a connected to the rotational shaft 9 of the motor-generator 3, a pump impeller 5b integrated with the front cover 5a, a turbine runner 5c disposed between the front cover 5a and the pump impeller 5b so as to face the pump impeller 5b, and a stator 5d disposed between the pump impeller 5b and the turbine runner 5c.

Furthermore, the lockup clutch 4 is disposed between the turbine runner 5c and the front cover 5a so as to face the inner surface of the front cover 5a and so as to be engageable with the front cover 5a. In addition, operation oil is filled in a chamber formed by the front cover 5a and the pump impeller 5b.

The lockup clutch 4 and the front cover 5a are adapted such that the engaging state therebetween is controllable. When the pump impeller 5b rotates along with the front cover 5a in a state in which the lockup clutch 4 is disengaged (i.e., in a disengaged state), the helical flow of the operation oil is produced, which makes the turbine runner 5c produce rotational driving power; thus, torque is transmitted to an output shaft 5e of the torque converter via the operation oil.

On the other hand, when the lockup clutch 4 is in a directly engaged state, the rotational driving power is directly transmitted from the front cover 5a to the turbine runner 5c and output shaft 5e without the operation oil intervening.

Note that because the engaging state of the lockup clutch 4 is set to be variable by controlling the operating oil pressure of the lockup clutch 4, the rotational driving power transmitted from the front cover 5a to the turbine runner 5c via the lockup clutch 4 can be freely set. The operating oil pressure of the lockup clutch 4 is controllable using a hydraulic circuit (not shown) provided between the lockup clutch 4 and the oil pump 12.

The transmission 6 comprises a gear train (not shown) which is provided between the input shaft 10 and an output shaft 7 thereof, and which enables changing transmission ratio, and a hydraulic circuit (not shown) for operating a clutch (not shown) for switching power transmission gears included in the gear train. The gear change operation of the transmission 6 is executed in such a manner that the ECU 13 controls the hydraulic circuit for the clutch so as to operate the clutch depending on, for example, the shift operation input by the driver, or depending on the driving state of the vehicle. The oil pump 12 is driven by being supplied electrical power from a battery device (not shown).

As shown in FIG. 1, various sensors 21 to 28 are connected to the ECU 13, and the ECU 13 controls selection of the power sources and the engaging state of the lockup clutch 4 based on information obtained by the sensors 21 to 28. More specifically, in this embodiment, the ECU 13 is provided with an engine state sensor 21 for finding the state of the engine 2 (e.g., whether or not a cylinder deactivation is executed, or whether or not a fuel cut operation is executed), an accelerator opening degree sensor 22, a brake operation sensor 23, a state of charge (SOC) sensor 24 for measuring the state of charge of a battery in which regenerated electrical power is stored, an air conditioner operation sensor 25, an operation oil temperature sensor 26 for measuring the temperature of the operation oil for the lockup clutch 4, a gear position sensor 27 for finding the gear position (GP) in the automatic transmission 6, and a slip ratio sensor 28 for measuring the slip ratio of the torque converter (efficiency of torque converter: ETR). In this embodiment, regeneration amount determining factors for retrieving a target amount of regeneration and friction torque determining factors for retrieving a friction torque are input into the ECU 13 using the above-mentioned sensors 21 to 28. These processes will be explained in detail below.

Figure 2:
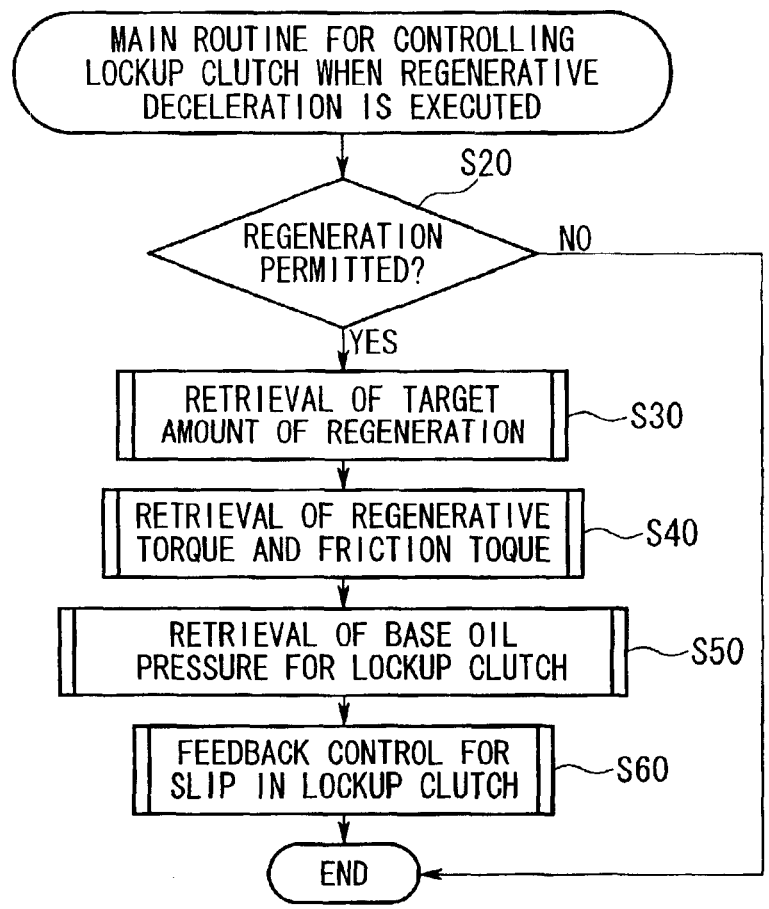
FIG. 2 is a flowchart showing the main routine of the control operation for a lockup clutch in the driving power control device shown in FIG. 1, in particular, when regenerative braking is executed.

The control operation, in particular, when a regenerative braking operation is performed, which is executed in the driving power control device 1 for a hybrid vehicle as constructed above will be explained with reference to FIG. 2. FIG. 2 is a flowchart showing the main routine of the control operation for the lockup clutch in the driving power control device 1 shown in FIG. 1, in particular, when regenerative braking is executed.

First, in step S20 shown in FIG. 2, it is determined whether a regenerative operation can be performed in the current state (i.e., whether a regenerative operation is permitted). When the result of the determination is "YES", the control operation proceeds to step S30, and when the result of the determination is "NO", the series of operations is terminated.

When the regenerative operation is permitted, the target amount of regeneration is retrieved depending on the driving state of the vehicle as shown in step S30. The retrieval of the target amount of regeneration is performed based on the regeneration determining factors, which will be explained below.

Next, in step S40, a regenerative torque corresponding to the target amount of regeneration is retrieved, and also a friction torque in the engine as one of the power sources is retrieved, and then, a required torque (torque at the end of the engine 2 and the motor-generator) is calculated while incorporating the friction torque into the regenerative torque. The retrieval of the friction torque is performed based on the friction torque determining factors, which will be explained below.

Next, in step S50, a base oil pressure for the lockup clutch 4 is calculated based on the required torque, a control operation is executed in a feedforward manner so that the oil pressure of the lockup clutch 4 coincides with the base oil pressure.

Then, in step S60, the engaging state of the lockup clutch 4 is controlled by controlling the oil pressure for the lockup clutch 4 in a feedback manner based on the difference between the target slip ratio (target ETR) and the actual slip ratio (actual ETR).

Figure 3:
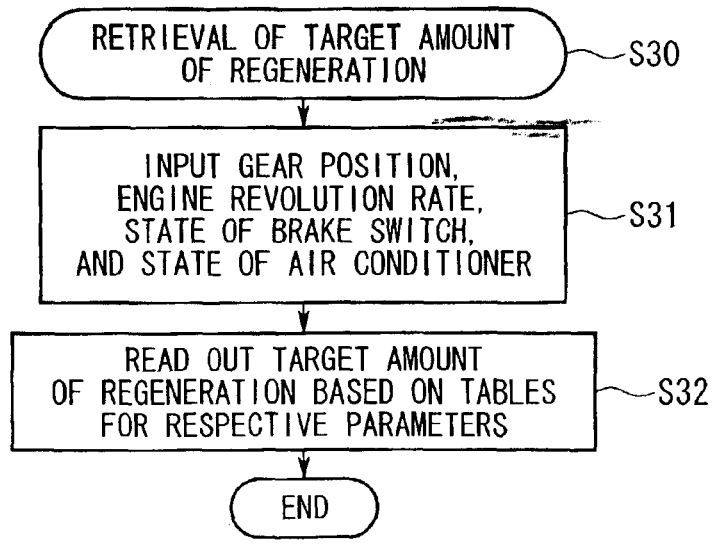
FIG. 3 is a flowchart showing a subroutine for executing an operation for retrieving a target amount of regeneration shown in FIG. 2.

Next, each of the control operations in the above-mentioned main routine will be explained in detail with reference to FIGS. 3 to 10. FIG. 3 is a flowchart showing a subroutine corresponding to step S30 in FIG. 2 for executing, in the ECU 13, the control operation for retrieving the target amount of regeneration. In this control operation, the regeneration amount determining factors based on information output from the above-mentioned sensors 21 to 28, which are to be used for retrieving the target amount of regeneration, are input into the ECU 13. More specifically, as shown in step S31, the regeneration amount determining factors such as the gear position (GP) in the automatic transmission 6, the revolution rate of the engine 2, whether a brake operation is executed, whether an air conditioner is operated, etc., are input into the ECU 13. The ECU 13 has stored therein various tables defining the amount of regeneration corresponding to various regeneration amount determining factors, and in step S32, the target amount of regeneration is read out from the tables.

Figure 4A:
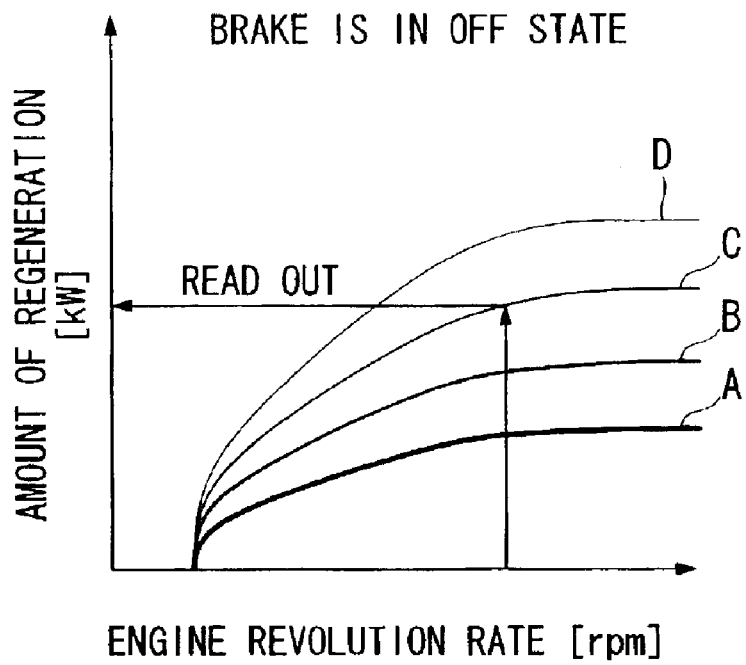
FIGS. 4A and 4B are graphs drawn based on tables that are used for the retrieval operation shown in FIG. 3.
Figure 4B:
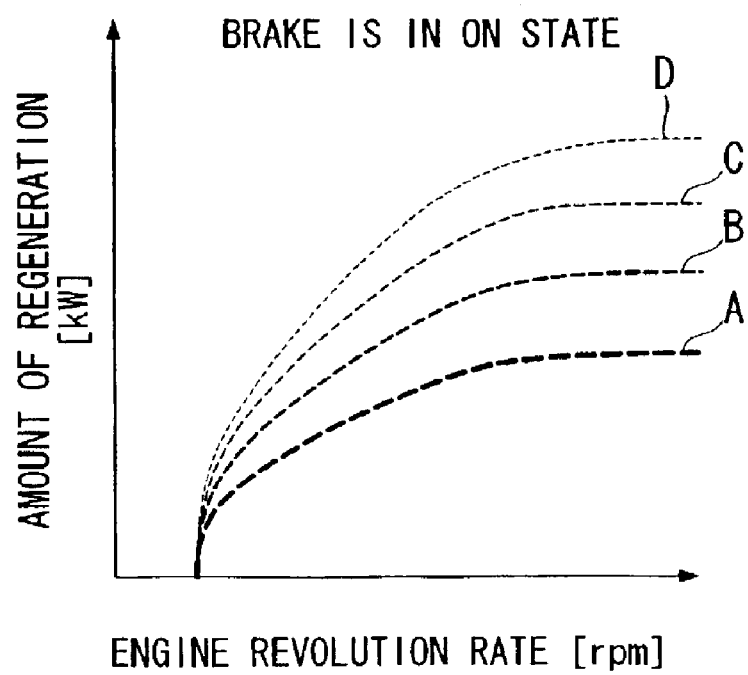

As an example of this process, the case in which the target amount of regeneration is read out from the table related to brake operation is shown in FIGS. 4A and 4B. FIG. 4A is a graph drawn based on a table defining the relationship between the engine revolution rate and the corresponding amount of regeneration when the brake is in the OFF state, and FIG. 4B is a graph drawn based on a table defining the relationship between the engine revolution rate and the corresponding amount of regeneration when the brake is in the ON state. Such relationships are determined for each of the gear positions (GP), and in FIGS. 4A and 4B, the lines A to D correspond to second to fifth gear positions, respectively. In FIG. 4A, there is shown, as an example, the case in which the target amount of regeneration is read out based on the engine revolution rate being input when the gear position is in the fourth gear position (i.e., indicated by the line C). Similarly, respective tables related to other regeneration determining factors are stored in the ECU 13, and the target amount of regeneration in each case is retrieved depending on the regeneration determining factors being input. Accordingly, an appropriate amount of regeneration can be determined depending on the driving state.

Next, a regenerative torque and a friction torque are retrieved. FIG. 5 is a flowchart showing a subroutine, shown as step S40 in FIG. 2, for executing the operation for retrieving a regenerative torque and a friction torque. In this operation, the friction torque determining factors used for retrieving a friction torque is input into the ECU 13 based on the above-mentioned sensors 21 to 28. More specifically, in step S41, the friction torque determining factors such as the engine revolution rate, whether or not a cylinder deactivation is executed, whether or not a fuel cut operation is executed, whether or not an air conditioner is operated, etc., are input into the ECU 13. The ECU 13 has been storing various tables defining the friction torque corresponding to the various friction torque determining factors (see FIG. 6C), and in step S42, an engine friction torque corresponding to the friction torque determining factors is read out from the tables. Then, the target amount of regeneration (see FIG. 6A) obtained in the above-mentioned processes is converted into a regenerative torque (see FIG. 6B), and in step S43, a required torque is calculated based on the regenerative torque while incorporating the engine friction torque (see FIG. 6D).

Figure 6A:
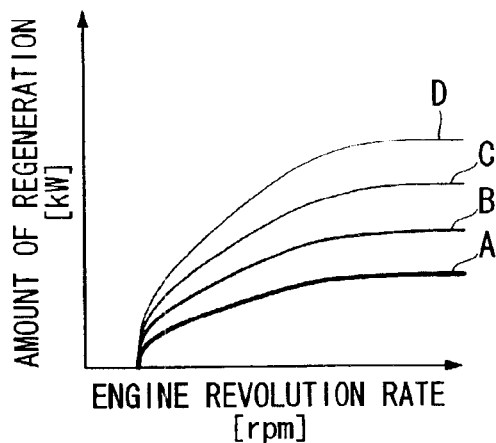
FIGS. 6A to 6D are graphs drawn based on tables that are used for the retrieval operation shown in FIG. 5.
Figure 6B:
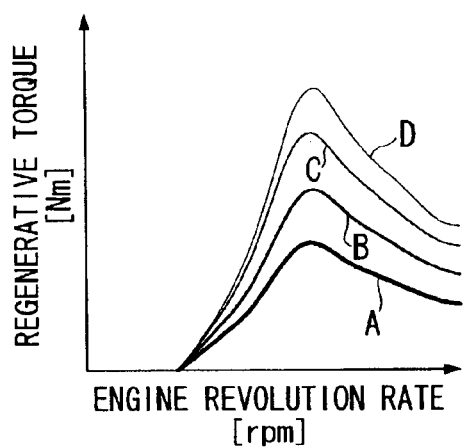

The control operation shown in FIG. 5 will be explained with reference to FIGS. 6A to 6D. FIG. 6A is a graph drawn based on a table which defines the relationship between the engine revolution rate and the amount of regeneration in each of the gear positions. FIG. 6B is a graph drawn based on a table which is made by converting the amount of regeneration into the regenerative torque. In FIGS. 6A and 6B, the lines A to D correspond to the second to fifth gear positions, respectively. Specifically, in this embodiment, the regenerative torque on the line C corresponding to the fourth gear position is retrieved.

Figure 6C:
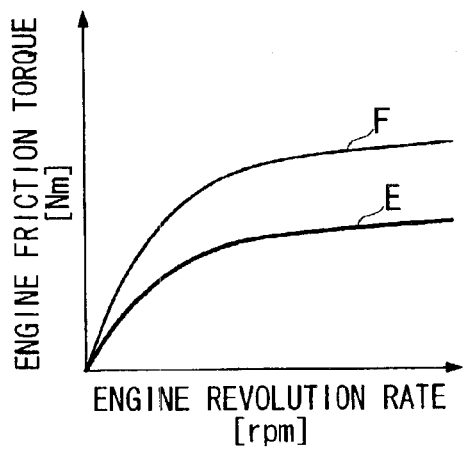
Figure 6D:
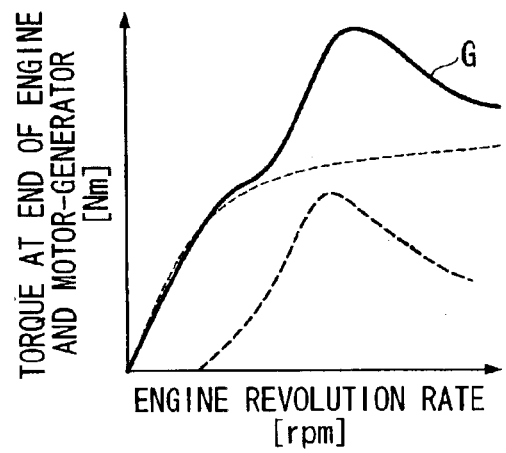

FIG. 6C is a graph drawn based on a table which defines the relationship between the engine revolution rate and the engine friction torque in each of the cases corresponding to whether or not a cylinder deactivation is executed, which is one of the friction torque determining factors. In FIG. 6C, the line E indicates the case in which a cylinder deactivation is executed, and the line F indicates the case in which a cylinder deactivation is not executed. FIG. 6D is a graph drawn based on a table which defines the relationship between the engine revolution rate and the required torque. The required torque is obtained by adding the friction torque shown in FIG. 6C to the regenerative torque shown in FIG. 6B. In FIG. 6D, the line G indicates the case in which the gear position is the fourth gear position (corresponding to the line C in FIG. 6B) and in which a cylinder deactivation is not executed (corresponding to the line F in FIG. 6C). Accordingly, it is possible to restrain noise and vibration, and to preferably maintain drivability, and in addition, a torque value for achieving a required amount of regeneration can be obtained. Similarly, respective tables corresponding to other friction torque determining factors are stored in the ECU 13, and the friction torque depending on the driving state can be determined based on these tables.

Figure 7:
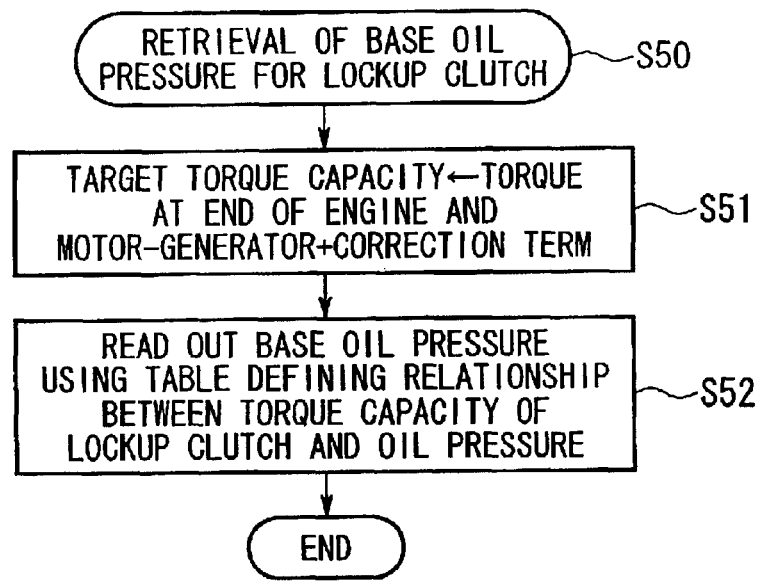
FIG. 7 is a flowchart showing a subroutine for executing an operation, shown in FIG. 2, for retrieving a base oil pressure to be applied to the lockup clutch.

Next, the base oil pressure for the lockup clutch 4 is determined. FIG. 7 is a flowchart showing a subroutine, corresponding to step S50 in FIG. 2, for executing the control operation for retrieving the base oil pressure for the lockup clutch (L/C) 4. In step S51 shown in FIG. 7, the required torque (at the end of the engine 2 and motor-generator 3) is determined to be α. When the base oil pressure for the lockup clutch 4 is calculated based on the torque value α, the torque value α is corrected using a correction term H which is determined by incorporating change in torque due to the degree of engagement of the lockup clutch 4 (i.e., the slip ratio which varies depending on the gear position or vehicle speed) into consideration. After correction, the target torque capacity is expressed by α'.

Figure 8:
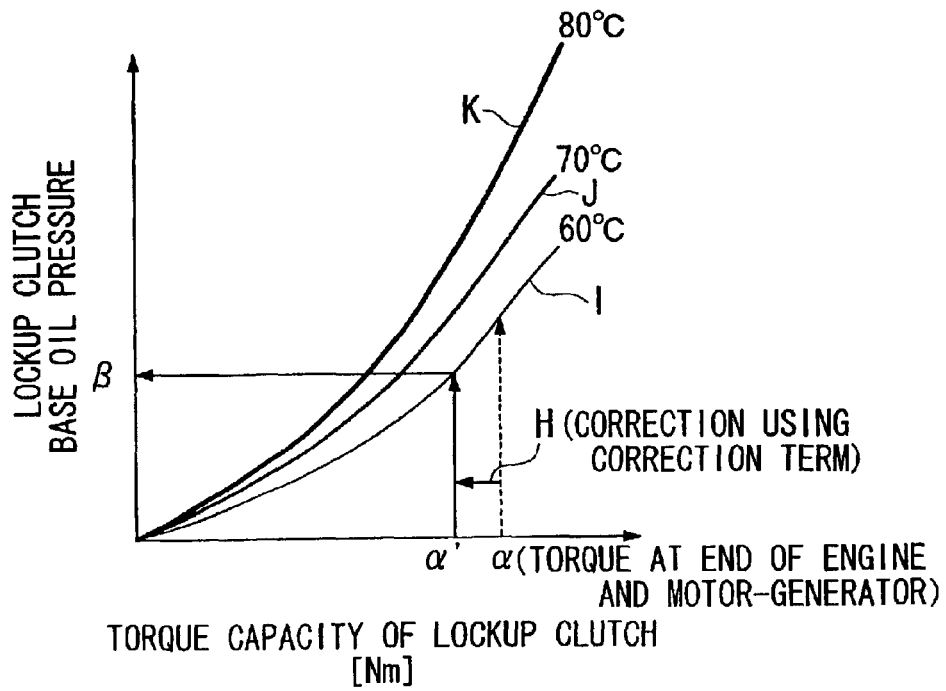
FIG. 8 is a graph drawn based on tables that are used for the retrieval operation shown in FIG. 7.

In step S52, the base oil pressure corresponding to the target torque capacity α' is retrieved using FIG. 8. FIG. 8 is a graph drawn based on a table which defines the relationship between the target torque capacity and the base oil pressure. In FIG. 8, the lines I to K correspond to the cases in which the temperature of the operation oil is 60° C., 70° C., and 80° C., respectively. The oil pressure for the lockup clutch 4 is controlled in a feedforward manner based on the base oil pressure calculated in the above process.

Accordingly, the lockup clutch 4 can be controlled such that an appropriate engagement state is achieved depending on the driving state. Moreover, because an appropriate base oil pressure is obtainable depending on the driving state even when the driving state changes, and because the lockup clutch 4 is controlled using the base oil pressure, the lockup clutch 4 can be controlled so that high efficiency in regeneration is obtainable even when the driving state changes.

Figure 9:
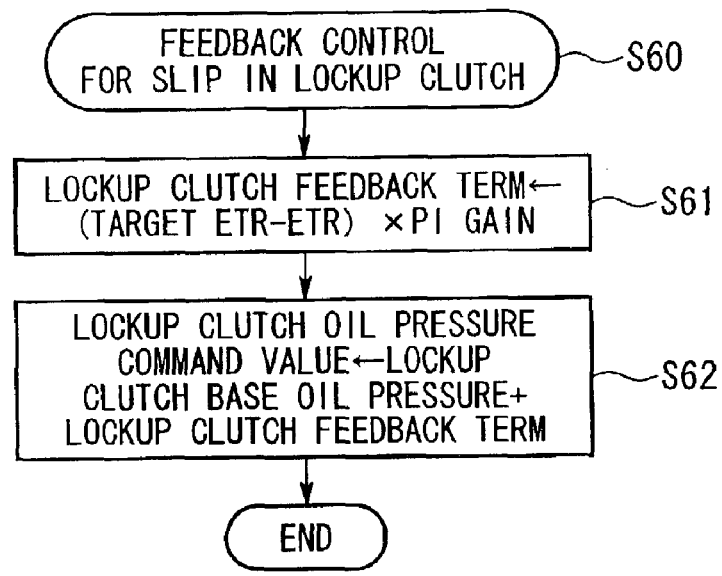
FIG. 9 is a flowchart showing a subroutine for executing a feedback control operation, shown in FIG. 2, for slip in the lockup clutch.
Figure 10:
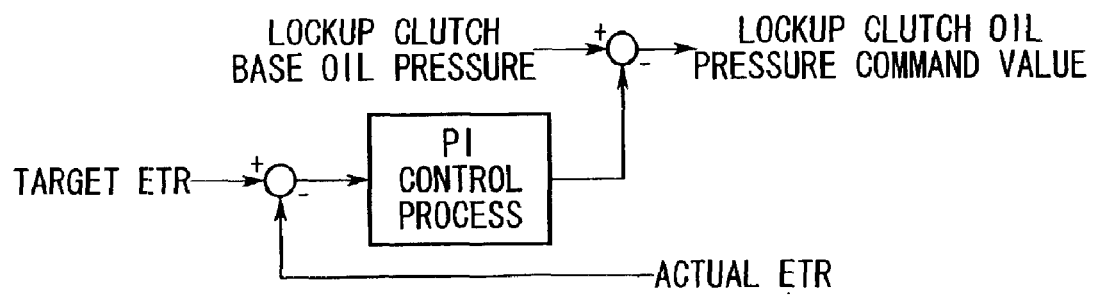
FIG. 10 is a block diagram explaining the control operation shown in FIG. 9.

As will be explained below, the oil pressure for the lockup clutch 4 is controlled in a feedback manner. FIG. 9 is a flowchart showing a subroutine, shown as step S60 in FIG. 2, for executing the feedback control operation for the lockup clutch 4. FIG. 10 is a block diagram showing the control operation executed according to FIG. 9. In this embodiment, the feedback control operation is executed using the torque converter slip ratio (ETR). The slip ratio of the torque converter is defined as follows:

$$ETR = Ns/Ne.$$

In the above equation, reference symbol Ns indicates the revolution rate of the input shaft 10, and reference symbol Ne indicates the revolution rate of the rotational shaft 9 of the engine 2. When executing the control operation for the slip ratio of the torque converter, a target slip ratio is calculated, and then, as shown in step S61 in FIG. 9, the difference between the target slip ratio and the actual slip ratio is calculated, and a PI control process (Proportioning and Integrating control process) is executed. More specifically, in step S61, a feedback term is obtained by multiplying the difference between the target slip ratio and the actual slip ratio by a PI gain. In step S62, an oil pressure command value of the lockup clutch 4 is obtained by adding the feedback term to the base oil pressure for the lockup clutch 4. Accordingly, accuracy of the control operation for the lockup clutch 4 is improved so that higher efficiency in regeneration is obtainable. Because the oil pressure of the lockup clutch 4 is controlled in a feedforward manner prior to the feedback control operation therefor, the amount of adjustment in the feedback control operation is relatively small. Therefore, even when the driving state changes, an appropriate control operation following the chages can be achieved in contrast to a conventional control operation. Note that a PI control process is used in this embodiment; however, the control process is not limited to this, and alternatively, a P control process (Proportioning control process), or a PID control process (Proportioning, Integrating, and Differentiating control process) may be used, if necessary.

As explained above, according to the driving power control device for a hybrid vehicle of this embodiment, the oil pressure for the lockup clutch can be controlled so that high efficiency in regeneration is obtainable even when the driving state changes. The present invention is not limited to the above embodiment, and, for example, the automatic transmission may be a conventional (stepped geared) automatic transmission or a CVT (Continuously Variable Transmission).

According to the present invention, the amount of regeneration can be set so that high efficiency in regeneration is obtainable even when the driving state changes. Moreover, it is possible to obtain a torque value for achieving a required amount of regeneration while restraining noise and vibration, and while preferably maintaining drivability. In addition, the lockup clutch can be controlled such that an appropriate engagement state is achieved depending on the driving state, i.e., the lockup clutch can be controlled so as to follow the changes in the driving state. Furthermore, accuracy of the control operation can be improved by executing a feedback control; therefore, the oil pressure for the lockup clutch can be controlled so that high efficiency in regeneration is obtainable even when the driving state changes.

What is claimed is:

1. A driving power control device for a hybrid vehicle, comprising:
    an engine and a motor-generator as power sources;
    an automatic transmission disposed between the power sources and driving wheels with an intervening torque converter having a lockup clutch; and
    a control section for controlling selection of the power sources and for controlling a slip ratio of the lockup clutch of the torque converter using oil pressure,
    wherein the control section is adapted to determine a target amount of regeneration depending on regeneration amount determining factors obtained in accordance with the driving state of the vehicle, to calculate a required regeneration torque based on regenerative torque corresponding to the target amount of regeneration while also incorporating friction torque retrieved depending on friction torque determining factors, to perform feedforward control in which a base oil pressure with which the required regeneration torque is transmittable is calculated, and an oil pressure of the lockup clutch is controlled to the base oil pressure calculated so as to obtain a target slip ratio of the lockup clutch, and to control the oil pressure of the lockup clutch in a feedback manner based on a difference between the target slip ratio and an actual slip ratio.

2. A driving power control device for a hybrid vehicle as claimed in claim 1, wherein the friction torque determining factors include at least one of whether or not a fuel cut operation is executed during deceleration, whether or not a cylinder deactivation operation is executed, and load of an air conditioner.

3. A driving power control device for a hybrid vehicle as claimed in claim 1, wherein the regeneration amount determining factors include at least one of a state of charge of a battery, a gear position in the automatic transmission, whether or not an air conditioner is operated, an engine speed, and a brake operation state of the vehicle.

4. A driving power control device for a hybrid vehicle as claimed in claim 1, wherein the control section stores a table defining a relationship between the target amount of regeneration and an engine speed.

5. A driving power control device for a hybrid vehicle as claimed in claim 1, wherein the control section stores a table defining a relationship between the base oil pressure for the lockup clutch and a transmittable torque capacity of the lockup clutch.

6. A driving power control device for a hybrid vehicle as claimed in claim 1, wherein the required regeneration torque which the control section calculates is a torque at an end of the engine and the motor-generator.

* * * * *